United States Patent
Scott et al.

(10) Patent No.: US 10,982,310 B2
(45) Date of Patent: Apr. 20, 2021

(54) CORROSION RESISTANT THERMAL SPRAY ALLOY

(71) Applicant: ResOps, LLC, Tomball, TX (US)

(72) Inventors: Joe L. Scott, Tomball, TX (US); Hai Nguyen, Spring, TX (US)

(73) Assignee: ResOps, LLC, Tomball, TX (US)

(*) Notice: Subject to any disclaimer, the term of this patent is extended or adjusted under 35 U.S.C. 154(b) by 73 days.

(21) Appl. No.: 16/351,167

(22) Filed: Mar. 12, 2019

(65) Prior Publication Data

US 2019/0309405 A1    Oct. 10, 2019

Related U.S. Application Data

(60) Provisional application No. 62/655,051, filed on Apr. 9, 2018, provisional application No. 62/695,953, filed on Jul. 10, 2018.

(51) Int. Cl.
 *B23K 35/30* (2006.01)
 *B23K 35/02* (2006.01)
 (Continued)

(52) U.S. Cl.
 CPC .......... *C23C 4/073* (2016.01); *B23K 35/0227* (2013.01); *B23K 35/0261* (2013.01);
 (Continued)

(58) Field of Classification Search
 None
 See application file for complete search history.

(56) References Cited

U.S. PATENT DOCUMENTS

| | | |
|---|---|---|
| 4,641,976 A | 2/1987 | Kar |
| 4,714,623 A | 12/1987 | Riccio et al. |

(Continued)

FOREIGN PATENT DOCUMENTS

| | | | |
|---|---|---|---|
| CN | 106244847 | * | 12/2016 |
| EP | 0223135 A1 | | 10/1986 |

(Continued)

OTHER PUBLICATIONS

Peters et al.; "Metallic Coatings for Corrosion Control of Marine Structures", Copper Development Association Inc. http://www.copper.org, Apr. 1999.

*Primary Examiner* — Xiaobei Wang
(74) *Attorney, Agent, or Firm* — Park, Vaughan, Fleming & Dowler LLP; Shane Nelson

(57) ABSTRACT

The present disclosure provides a thermal spray alloy system that is more resistant to corrosion than conventional alloy compositions. The disclosed alloy comprises copper as the main component and also potentially nickel, tin, boron, and/or carbon as other principle elements. The alloy composition may utilize a cored wire, and an outer sheath of the cored wire may comprise unalloyed copper. The alloy has superior corrosion resistance to a wide number of corrosive materials, such as hydrogen sulfide, carbon dioxide/carbonic acid, sodium chloride/potassium chloride (salts), bio-fouling, and micro-biologicals. The alloy demonstrates superior thermal conductivity compared to nickel based alloys and stainless steels. The alloy may form an anti-corrosive coating that may be applied to any number of substrates. The disclosed alloy may be applied to a substrate in thick layers, such as between 0.100 inches and 3.0 inches, and may be used to form shapes, such as centralizers.

21 Claims, 11 Drawing Sheets

(51) Int. Cl.

| | |
|---|---|
| *C22C 9/01* | (2006.01) |
| *C22C 9/05* | (2006.01) |
| *C22C 9/10* | (2006.01) |
| *C22C 9/02* | (2006.01) |
| *C22C 9/06* | (2006.01) |
| *C23C 4/073* | (2016.01) |
| *C23C 4/131* | (2016.01) |

(52) U.S. Cl.
CPC .............. *B23K 35/302* (2013.01); *C22C 9/01* (2013.01); *C22C 9/02* (2013.01); *C22C 9/05* (2013.01); *C22C 9/10* (2013.01); *C23C 4/131* (2016.01); *C22C 9/06* (2013.01)

(56) References Cited

U.S. PATENT DOCUMENTS

| | | |
|---|---|---|
| 4,725,508 A | 2/1988 | Rangaswamy et al. |
| 4,751,113 A | 6/1988 | Riccio et al. |
| 4,822,415 A | 4/1989 | Dorfman et al. |
| 4,939,015 A | 7/1990 | Riccio et al. |
| 5,385,789 A | 1/1995 | Rangaswamy et al. |
| 5,429,680 A | 7/1995 | Fuschetti |
| 5,648,123 A | 7/1997 | Kuhn et al. |
| 5,945,171 A | 8/1999 | Cook |
| 5,958,522 A | 9/1999 | Nakagawa et al. |
| 6,428,858 B1 | 8/2002 | Bolton et al. |
| 6,811,623 B2 | 11/2004 | Boegel et al. |
| 6,926,779 B1 * | 8/2005 | Bin ................. B32B 15/015 148/432 |
| 7,487,840 B2 | 2/2009 | Gammage et al. |
| 9,097,276 B2 | 8/2015 | Ernst et al. |
| 9,546,414 B2 | 1/2017 | Izquierdo et al. |
| 9,611,531 B1 | 4/2017 | Crawmer |
| 9,631,157 B2 * | 4/2017 | Badrak ................. B23K 9/04 |
| 9,818,512 B2 | 11/2017 | Martin et al. |
| 9,920,412 B2 | 3/2018 | Scott et al. |
| 2002/0197132 A1 | 12/2002 | Cruz et al. |
| 2004/0202861 A1 | 10/2004 | Itsukaichi et al. |
| 2006/0124283 A1 | 6/2006 | Abi-Akar et al. |
| 2006/0216429 A1 | 9/2006 | Bengtsson et al. |
| 2007/0166478 A1 | 7/2007 | Itsukaichi et al. |
| 2013/0189540 A1 * | 7/2013 | McDaniel ................. C22C 9/04 428/675 |
| 2017/0312861 A1 * | 11/2017 | Jin ................. B23K 35/362 |
| 2019/0010598 A1 | 1/2019 | Scott et al. |

FOREIGN PATENT DOCUMENTS

| | | | |
|---|---|---|---|
| EP | 0254164 A1 | 7/1987 | |
| EP | 2878840 A1 | 10/2014 | |
| JP | H01-198407 | * 8/1989 | |
| RU | 170923 | * 5/2017 | |
| WO | WO-2019191282 A1 | * 10/2019 | ................. F01L 3/02 |

* cited by examiner

FIG.6A
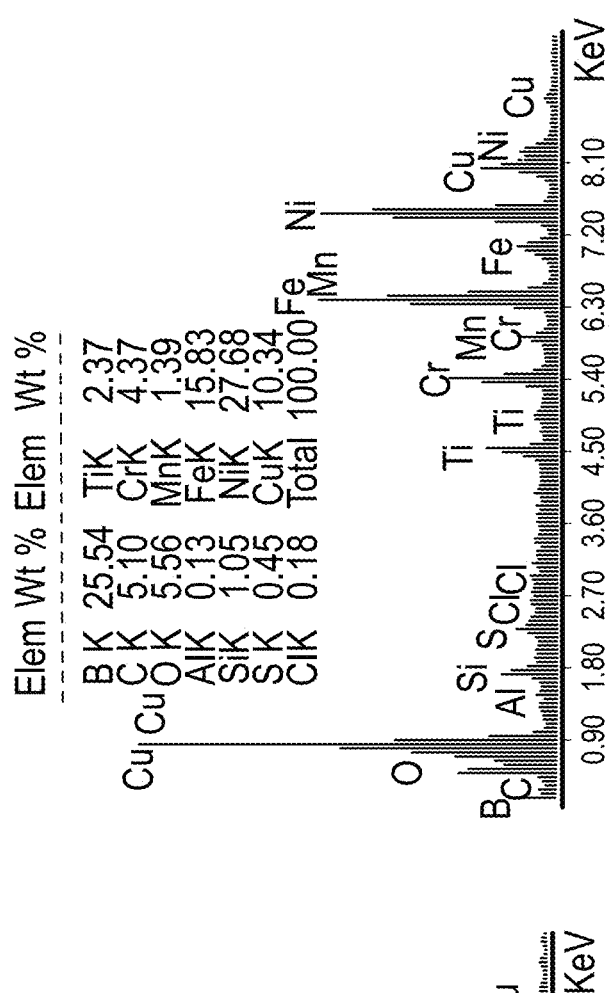
FIG.6B
FIG.6C

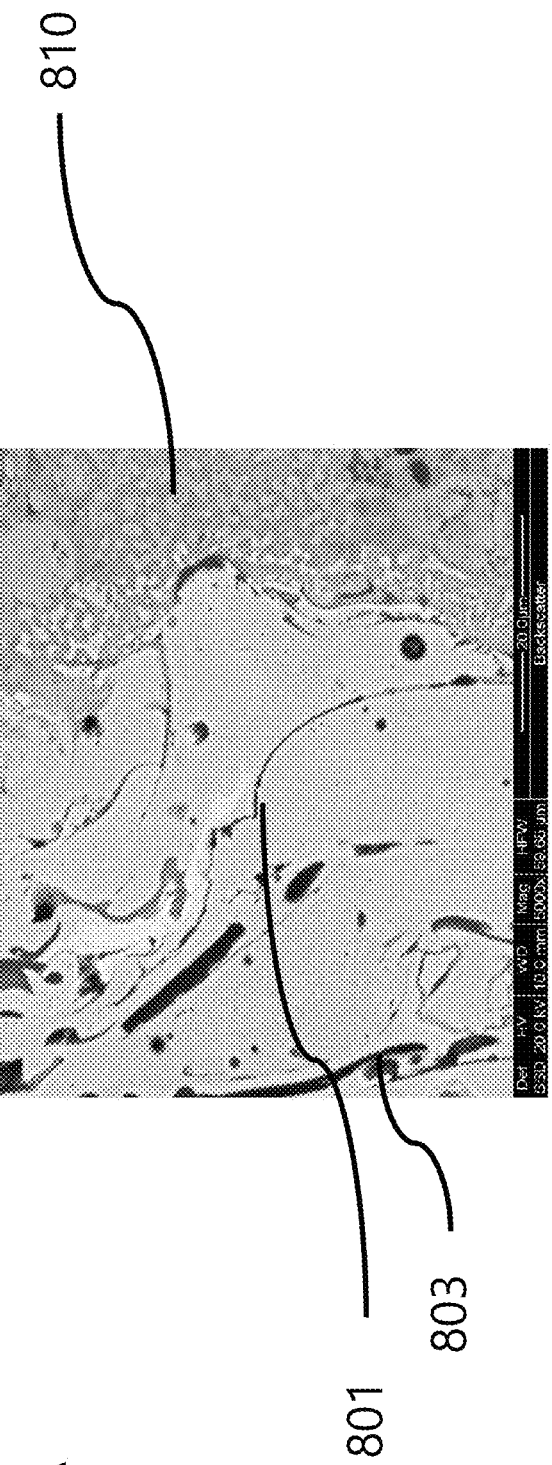
FIG.8A
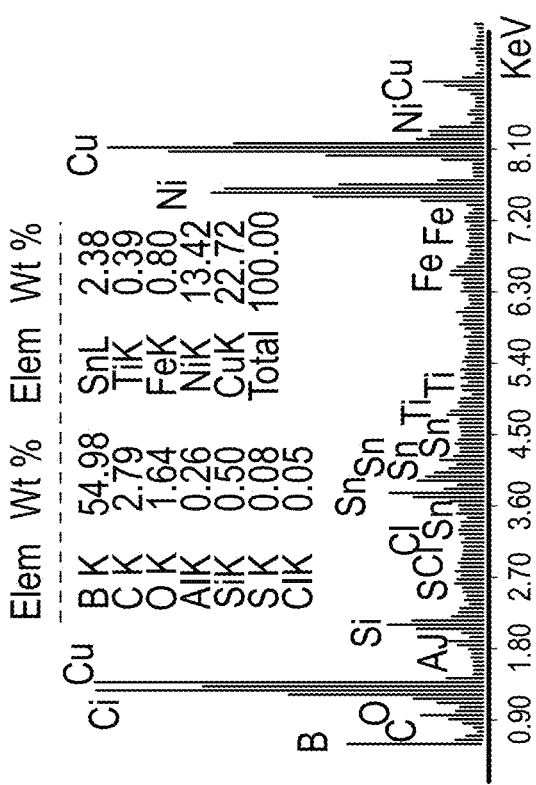
FIG.8B
FIG.8C

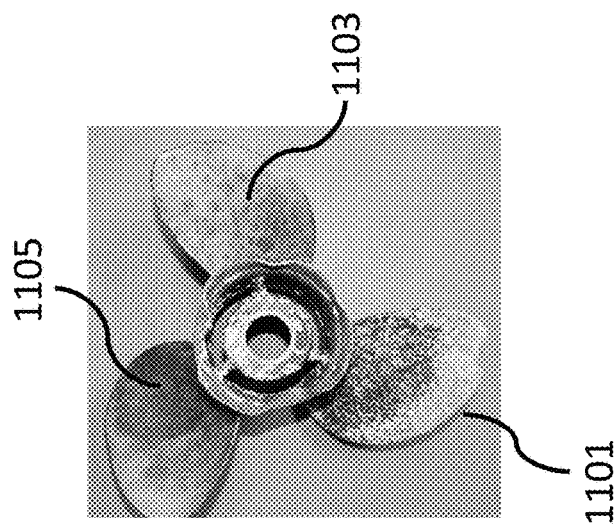
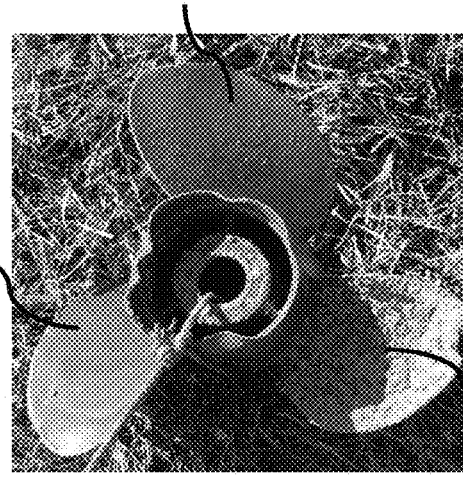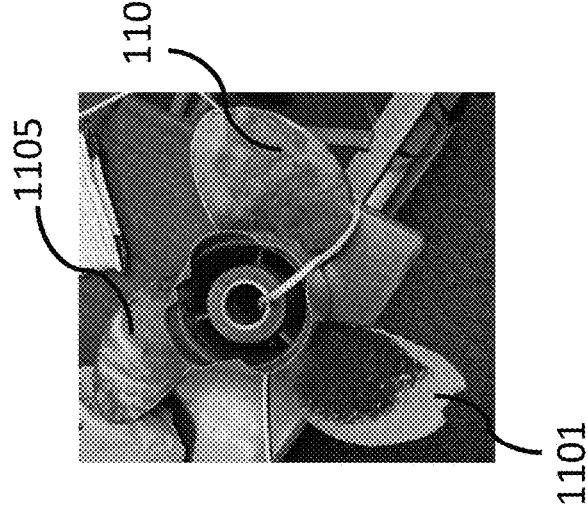

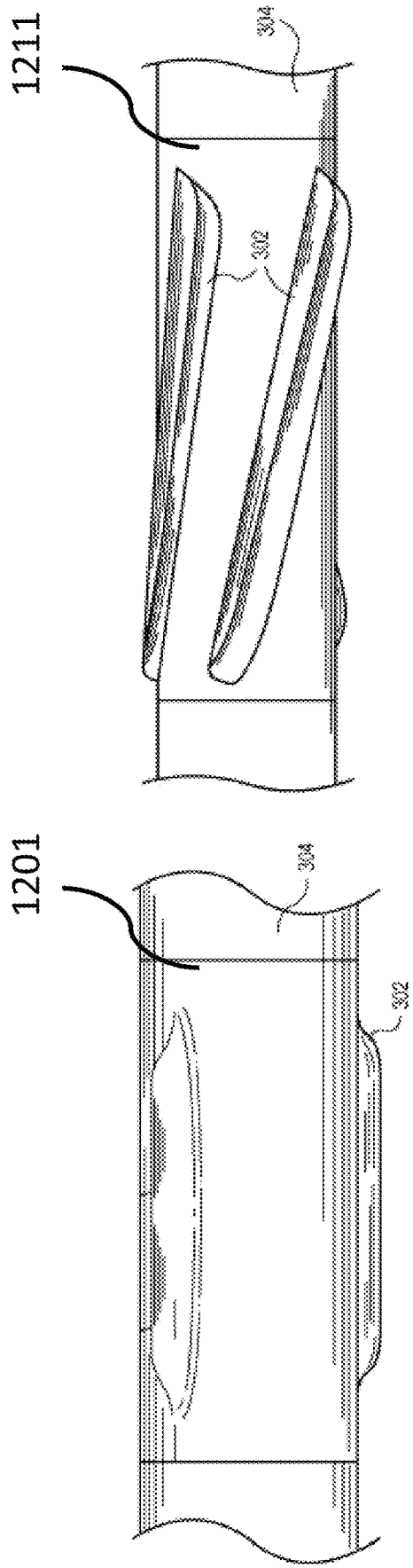
FIG. 12A
FIG. 12B
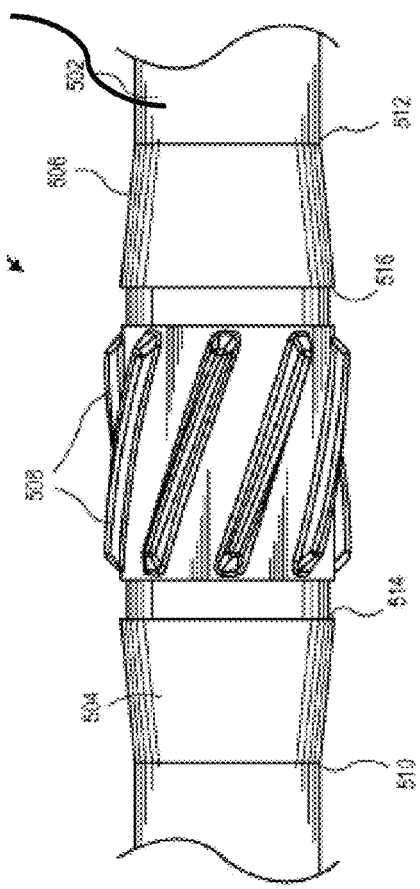
FIG. 12C

CORROSION RESISTANT THERMAL SPRAY ALLOY

This application claims priority to U.S. provisional patent application Nos. 62/655,051, filed on Apr. 9, 2018, and 62/695,953, filed on Jul. 10, 2018, the entire contents each of which is incorporated herein by reference.

BACKGROUND OF THE INVENTION

Field of the Invention

The invention relates to coatings applied to equipment and other substrates, and more particularly to thermally sprayed layers of a principally copper based alloy for a wide range of substrates, including downhole equipment in oil and gas wells and marine devices.

Description of the Related Art

Drilling wells for oil and gas recovery, as well as for other purposes, involve the use of drill pipes and other downhole equipment necessary for the exploration and production of oil and gas. Downhole equipment is exposed to severe abrasive wear conditions and corrosive environments. Thermal spray coatings have been used to help prevent (or mitigate) wear conditions for downhole components, but existing alloys are not particularly helpful for corrosive applications.

As is known in the art, the term "thermal spray" is a generic term for a group of processes in which metallic, ceramic, cermet, and some polymeric materials in the form of powder, wire, or rod are fed to a torch or gun with which they are heated to near or somewhat above their melting point. The resulting molten or nearly molten droplets of materials are projected against the surface to be coated. Upon impact, the droplets flow into thin lamellar particles adhering to the surface, overlapping and interlocking as they solidify. The total coating thickness is usually generated in multiple passes of the coating device; depending on the application, the layer may be applied in thick deposits exceeding 0.100," although ranges in the amount between 0.020" up to 3.0" are possible. Various thermal spray techniques may include flame spraying, flame spray and fuse, electric-arc (wire-arc) spray, and plasma spray. Thermal spray may be applied to a wide variety of tools, equipment, structures, and materials, and is not limited to merely downhole components. Thermal spray with special alloys is applied to drill pipe, casing, sucker rods and other components used in the drilling, completion and production of oil and natural gas. Among other benefits, this application is used to mitigate wear, reduce friction, and to create a standoff from the annulus of the hole.

The prior art discloses various methods for thermal spraying. For example, U.S. Pat. No. 7,487,840 ("the '840 patent"), incorporated herein by reference, discloses a protective wear coating on a downhole component for a well through a thermal spraying process in combination with an iron-based alloy. The thermal spraying process melts the material to be deposited while a pressurized air stream sprays the molten material onto the downhole component. The coating operation takes place at low temperatures without fusion or thermal deterioration to the base material. The wear resistance is increased while providing a lower coefficient of friction by the wear resistant layer relative to a coefficient of friction of the downhole equipment without the wear resistant layer. FIG. 3 of the '840 patent is reproduced in the present disclosure as FIG. 1 as an exemplary thermal spraying process that may be used in conjunction with the present invention. The following two paragraphs describe FIG. 3 of the '840 patent are reproduced from the specification of the '840 patent at column 6, ll. 3-27:

"FIG. 3 [reproduced as FIG. 1 in the present disclosure] is a schematic diagram of an exemplary thermal spray system for applying a wear resistant layer to a downhole component, according to the present invention. One type of thermal spraying system 30 that is advantageously used is a twin wire system. The twin wire system uses a first wire 32 and a second wire 34. In at least one embodiment, the first wire 32 and the second wire 34 generally are of the same nature, whether solid or tubular, and the same diameter, but not necessarily of the same chemical composition. For example, the first wire 32 could be of a first composition, while the second wire 34 could of the same or a complementary composition to the first composition to yield a desired wear resistant layer on the base material."

"A voltage is applied to the wires. The proximity of the wire ends creates an arc 35 between the ends and cause the wires to melt. A high-pressure compressed air source 36 atomizes molten metal 38 caused by the arcing into fine droplets 40 and propels them at high velocity toward the downhole component, such as conduit 10 or other components, to being deposited on the external surface 26. The twin wire spraying process can use commercially available equipment, such as torches, wire feeding systems and power sources. Other thermal spraying processes are available and the above is only exemplary as the present invention contemplates thermal spraying processes in general for this particular invention."

Likewise, U.S. Pat. No. 9,920,412 ("the '412 patent"), incorporated herein by reference, discloses a similar thermal spray technique with a chromium free composition of thermally sprayed material. The '412 patent discloses applying this composition onto tubulars to form centralizers. While conventional thermally sprayed layers (such as that disclosed in the '840 patent and the '412 patent) are useful in numerous instances, such compositions are not helpful for corrosive environments. There is a need in the oil industry for a highly corrosion resistant thermal spray product. Many oil wells contain highly corrosive compounds, including hydrogen sulfide, carbon dioxide, salt water, and microbes. Each of these induces destructive corrosion leading to leaks and failure of metal components that are used for flow control and pumping. Failure requires that a work over rig be contracted and the components pulled from the well and replaced, resulting in production down time and the expense of the work over rig as well as the replacement of the component. These oil production components stay in the well and remain in constant contact with the oil and corrosive agents.

Rather than manufacturing the components from solid corrosion resistant alloys, low alloy steels are often specified and then coated with a corrosion resistant alloy using the thermal spray process. For example, one current approach is to use twin wire arc spray (TWAS) where one wire is AWS A5.11 ERNiCu-7 (commonly known as Monel) and the second wire is stainless steel, such as AWS A5.9 ER316L. However, this combination, while better than other alloys, still corrodes at rates faster than desired.

Various alloys have utilized copper and nickel alloys for different purposes and different compositions than described herein. For example, U.S. Pat. No. 9,631,157, incorporated herein by reference, discloses a copper-nickel-tin alloy that is focused on friction and wear (not corrosion prevention), and the deposit is heat treated after deposition on a surface. U.S. Pat. No. 4,641,976, incorporated herein by reference, also discloses a copper-nickel-tin alloy that is used on a metal bearing and is focused on friction and wear protection as opposed to corrosion prevention. U.S. Patent Publication No. 2002/0197132, incorporated herein by reference, discloses a copper-nickel alloy that is used for sucker rod coupling. It is heat treated after deposition on a surface and has a different composition than that described herein.

Various data exists that displays various corrosive effects of different materials and/or compositions with different corrosive media. For example, Oilfield Metallurgy and Corrosion (4th Edition), available from National Association of Corrosion Engineers (NACE) International, provides a table of different corrosive media that causes stress-corrosion cracking. See, e.g., Table 2-5 on page 83, incorporated herein by reference. As illustrated in Table 2-5, copper nickel is referenced as material no. 11 and Monel is referenced as material no. 13, and these alloys provide corrosion resistance to the vast majority of corrosive media tested, and particularly those likely to be found in downhole conditions. The following corrosive media are potentially problematic in downhole conditions: hydrogen sulfide, carbon dioxide, carbonic acid, and chloride salts (sodium chloride and potassium chloride), among others. Further, micro-biologicals downhole have been known to emit chemicals that corrode downhole components.

It is also known in the art that metallic coatings can be applied to marine structures to help control corrosion. For example, an April 1999 publication by the Copper Development Association entitled "Metallic Coatings for Corrosion Control of Marine Structures," incorporated herein by reference, discusses copper nickel alloys that can be applied to marine structures for corrosion and biofouling resistance. These alloys are not thermally sprayed onto the marine devices, but are instead generally painted, welded onto or glued on, or otherwise attached by other mechanical methods such as screwing or clamping, or in some instances may form the entire material itself (such as solid copper based hulls). In many instances, an alloy sheathing requires electrical insulation to insulate the copper sheathing from the underlying steel, which then requires pumping cement or an epoxy into (or otherwise using an elastomer or rubber insulator) the annular space between the substrate and the copper sheath.

A need exists for an improved method and system for thermally sprayed layers that are more resistant to corrosion. A need exists for an improved method and system for thermally sprayed layers on downhole components that is more corrosion resistant to conditions existing in downhole environments. A need exists for an improved thermal spray alloy system for marine environments to prevent biological growth. A need exists for an improved thermal spray alloy system that can be applied in thicknesses greater than 0.100" for creating shapes such as centralizer blades or ribs on oilfield casing.

SUMMARY OF THE INVENTION

The present disclosure provides a thermal spray alloy system that is more resistant to corrosion than conventional alloy compositions. In one embodiment, the present disclosure utilizes copper and nickel as principle components of the thermal spray alloy. In another embodiment, the present disclosure utilizes a thermal spray alloy that is principally copper based with other alloys but not including nickel. In addition to copper and nickel, other principal components may potentially include tin, boron, and/or carbon. In one embodiment, an outer sheath of the cored wire may comprise unalloyed copper.

The composition may comprise a majority percentage by weight of copper or a majority percentage by weight of copper and nickel, and may have at least twice the amount of copper as nickel. The disclosed alloy system has demonstrated superior corrosion resistance to a wide number of corrosive materials, such as hydrogen sulfide, carbon dioxide/carbonic acid, sodium chloride/potassium chloride (salts), bio-fouling, and micro-biologicals. The disclosed alloy system also demonstrates superior thermal conductivity compared to nickel based alloys and stainless steels. The object to be coated may be a downhole component or other tool used in the oil and gas industry, or may be applied to any object or tool that needs an increased corrosive protection layer and/or thermally dissipative layer including in diverse fields such as marine, chemical processing, and refining.

In one embodiment, disclosed is a composition for thermally spraying to a substrate, the composition comprising about 50.0 wt % to about 90.0 wt % of copper and about 10.0 wt % to about 40.0 wt % of nickel. The composition may comprise at least about 0.5 wt % of carbon or boron, or at least about 0.5 wt % each of both carbon and boron. In one embodiment, the composition comprises at least twice the percentage by weight of copper as nickel, and in other embodiments the composition comprises at least 20 wt % of nickel. The composition may comprise at least 5 wt % tin.

In one embodiment, the copper and nickel elements are located substantially within an outer sheath of a cored wire. The composition may be part of a cored wire, wherein an outer sheath of the cored wire is unalloyed copper, or at least comprises substantially copper.

In one embodiment, the composition comprises about 50.0 wt % to about 90.0 wt % of copper, about 10.0 wt % to about 40.0 wt % of nickel, about 0.0 wt % to about 4.0 wt % of carbon, about 0.0 wt % to about 9.0 wt % of boron, about 0.0 wt % to about 5.0 wt % of iron, about 0.0 wt % to about 5.0 wt % of titanium, about 0.0 wt % to about 6.0 wt % of aluminum, about 0.0 wt % to about 3.0 wt % of manganese, and about 0.0 wt % to about 10.0 wt % of tin. In another embodiment, the composition comprises about 50.0 wt % to about 60.0 wt % of copper, about 20.0 wt % to about 30.0 wt % of nickel, about 1.0 wt % to about 4.0 wt % of carbon, about 1.0 wt % to about 4.0 wt % of boron, about 0.5 wt % to about 2.0 wt % of iron, about 0.5 wt % to about 2.0 wt % of titanium, about 2.0 wt % to about 4.0 wt % of aluminum, about 0.5 wt % to about 1.0 wt % of manganese, and about 0.0 wt % to about 10.0 wt % of tin. In another embodiment, the composition comprises about 50.0 wt % to about 56.0 wt % of copper, about 25.0 wt % to about 30.0 wt % of nickel, about 2.0 wt % to about 4.0 wt % of carbon, about 1.0 wt % to about 2.0 wt % of boron, about 0.5 wt % to about 1.5 wt % of iron, about 1.0 wt % of titanium, about 2.0 wt % to about 3.0 wt % of aluminum, about 0.5 wt % to about 1.0 wt % of manganese, and about 6.0 wt % to about 10.0 wt % of tin.

In one embodiment, the composition for thermally spraying to a substrate comprises a composition of about 50.0 wt % to about 95.0 wt % of copper and about 0.0 wt % to about 40.0 wt % of nickel. In one embodiment, the composition is part of a cored wire, wherein an outer sheath of the cored wire is unalloyed copper. The composition may comprise at least 6 wt % of aluminum, at least 4 wt % of boron, at least 2 wt % of chromium, at least 1 wt % of zirconium, and/or at least 3 wt % of iron. In one embodiment, the composition may comprise about 10.0 wt % to about 40.0 wt % of nickel.

Also disclosed is a cored wire for thermally spraying to a substrate, wherein the cored wire comprises an inner core comprising a plurality of powdered elements and an outer sheath substantially enclosing the plurality of powdered elements of the inner core, wherein the outer sheath comprises at least 50.0 wt % of copper. In one embodiment, the outer sheath comprises at least 75% of copper, in another embodiment the outer sheath comprises at least 90% of copper, while in another embodiment the outer sheath is unalloyed copper. In one embodiment, the outer sheath comprises about 10.0 wt % to about 40.0 wt % of nickel. In one embodiment, the plurality of powdered elements comprises either boron or carbon, while in another embodiment the plurality of powdered elements comprises boron, carbon, and tin.

Also disclosed is a thermally sprayed coating on a substrate, comprising a coating of thermally sprayed metallic material on a substrate, wherein the coating is formed by a first layer of metallic material that comprises about 50.0 wt % to about 95.0 wt % of copper and about 0.0 wt % to about 40.0 wt % of nickel. In one embodiment, the coating may comprise at least 10 wt % nickel, and may comprise boron and/or carbon. In one embodiment, the coating comprises a second layer of a thermally sprayed metallic material on top of the first layer, wherein the first layer comprises a first composition and the second layer comprises a second composition. In this embodiment, the second layer may comprise a wear-resistant layer, the first layer may provide corrosion resistance to the substrate, and the first and second layer may each be between 0.010" and 0.10" thick. In one embodiment, the first layer comprises a thickness of at least 0.10 inches, at least 1.0 inches, between about 0.010 inches and 0.060 inches, between about 0.10 inches and 1.0 inches, or between about 1.0 inches and 3.0 inches. In one embodiment, the coating comprises a corrosion resistant layer and is substantially free of micro-cracks.

In one embodiment, the thermally sprayed coating is formed on the substrate to create a downhole component, such as a centralizer. In one embodiment, the coating is configured in the shape of a protrusion around a tubular, such as a rib, blade, or band. In one embodiment, the coating forms a downhole component, wherein the downhole component comprises a centralizer. In another embodiment, the coating forms one or more blades on a tubular in the configuration of a centralizer.

In one embodiment, also disclosed is a method for applying a coating to a substrate, the method comprising thermally spraying metallic material on an external surface of a substrate, wherein the material, at least prior to melting, comprises a composition of about 50.0 wt % to about 95.0 wt % of copper and about 0.0 wt % to about 40.0 wt % of nickel. In one embodiment, the material is a cored wire, and the copper may be located substantially within an outer sheath of the cored wire. In one embodiment, the composition may comprise about 10.0 wt % to about 40.0 wt % of nickel. In one embodiment, the thermal spray technique may comprise a twin wire arc spray.

In one embodiment, the method may comprise creating an exothermic reaction during the thermal spray step. The sprayed layer can be a variety of thicknesses. The method may further comprise forming a layer of the sprayed metallic material on the substrate, wherein the layer comprises a thickness of at least 0.10 inches or at least 1.0 inches. In other embodiments, the layer may comprise a thickness of between about 0.010 inches and 0.060 inches, or a thickness of between about 0.10 inches and 1.0 inches, or a thickness of between about 1.0 inches and 3.0 inches.

In one embodiment, the substrate may comprise a prior coating, and the method may further comprise thermally spraying metallic material on the prior coating. In one embodiment, the prior coating may be a non-metallic coating, or in other embodiments may be a metallic coating, and in still other embodiments the prior coating may or may not be a thermally sprayed coating. In one embodiment, the disclosed method may further comprise forming a first layer of the sprayed metallic material on the substrate and forming a second layer on top of the first layer, wherein the second layer comprises a different composition than the first layer. In one embodiment, the first layer may comprise a corrosion resistant layer and the second layer may comprise a wear resistant layer.

Also disclosed is a modified downhole component, such as drill pipe, that comprises a downhole component with an external surface and a layer of metallic material that is thermally sprayed onto a portion of the external surface, wherein the layer of metallic material comprises a composition of about 50.0 wt % to about 95.0 wt % of copper and about 0.0 wt % to about 40.0 wt % of nickel. The layer may further comprise at least 10.0 wt % of nickel and boron and/or carbon. The composition of the metallic material may be prior to melting. In one embodiment, the layer forms one or more blades on the downhole component in the configuration of a centralizer.

Also disclosed is a downhole tool, which may comprise a layer of thermally sprayed metallic material extending outwards from a downhole tubular, wherein the layer of material comprises a composition of about 50.0 wt % to about 95.0 wt % of copper and about 0.0 wt % to about 40.0 wt % of nickel. In one embodiment, the layer may comprise at least 10.0 wt % nickel, and boron and/or carbon. The layer may be between 0.010" and 0.060" thick, between 0.10" and 1.0" thick, between about 1.0 inches and 3.0 inches, or at least 1.0" thick.

In one embodiment, the layer of material comprises a coating on the downhole tool. In one embodiment, the layer is formed in the shape of a rib, blade, band, or stop ring. In one embodiment, the layer comprises a blade of a centralizer or a stabilizer that is directly coupled to the tubular, while in other embodiments the layer forms a shoulder extending from the tubular, wherein the shoulder is configured to engage and resist a movement of a downhole tool relative to the tubular. In one embodiment, the tool may comprise a centralizer or stabilizer.

In one embodiment, the substrate on which the thermally sprayed metallic material can be a wide range of tools, components, equipment, and devices. In one embodiment, the substrate is a downhole component, such as a drill pipe, downhole pump, or mud motor. In other embodiments, the substrate may be a marine device, such as a marine propeller.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 6A illustrates a cross-sectional view of a corrosion coupon with a layer of a Monel+SS alloy after a SCC test, at a magnification of 1500×.

FIGS. 6B and 6C illustrate the corresponding elemental composition of the alloy breakdown from FIG. 6A against a black strip.

FIG. 8A illustrates a cross-sectional view of a corrosion coupon with a layer of a copper nickel based alloy (CUNIA sample) after a SCC test, at a magnification of 5000×.

FIGS. 8B and 8C illustrate the corresponding elemental composition of the alloy breakdown from FIG. 8A.

FIGS. 11A-11C illustrate an aluminum propeller coated with a Monel alloy and a copper nickel alloy (along with one blade left uncoated) for a biofouling marine test.

FIGS. 12A-12C illustrate various embodiments of a downhole component that may be formed by thermally spraying the disclosed copper based alloy, which is reproduced from FIGS. 3, 4, and 6 of U.S. Pat. No. 9,920,412.

DETAILED DESCRIPTION

Figure 1:
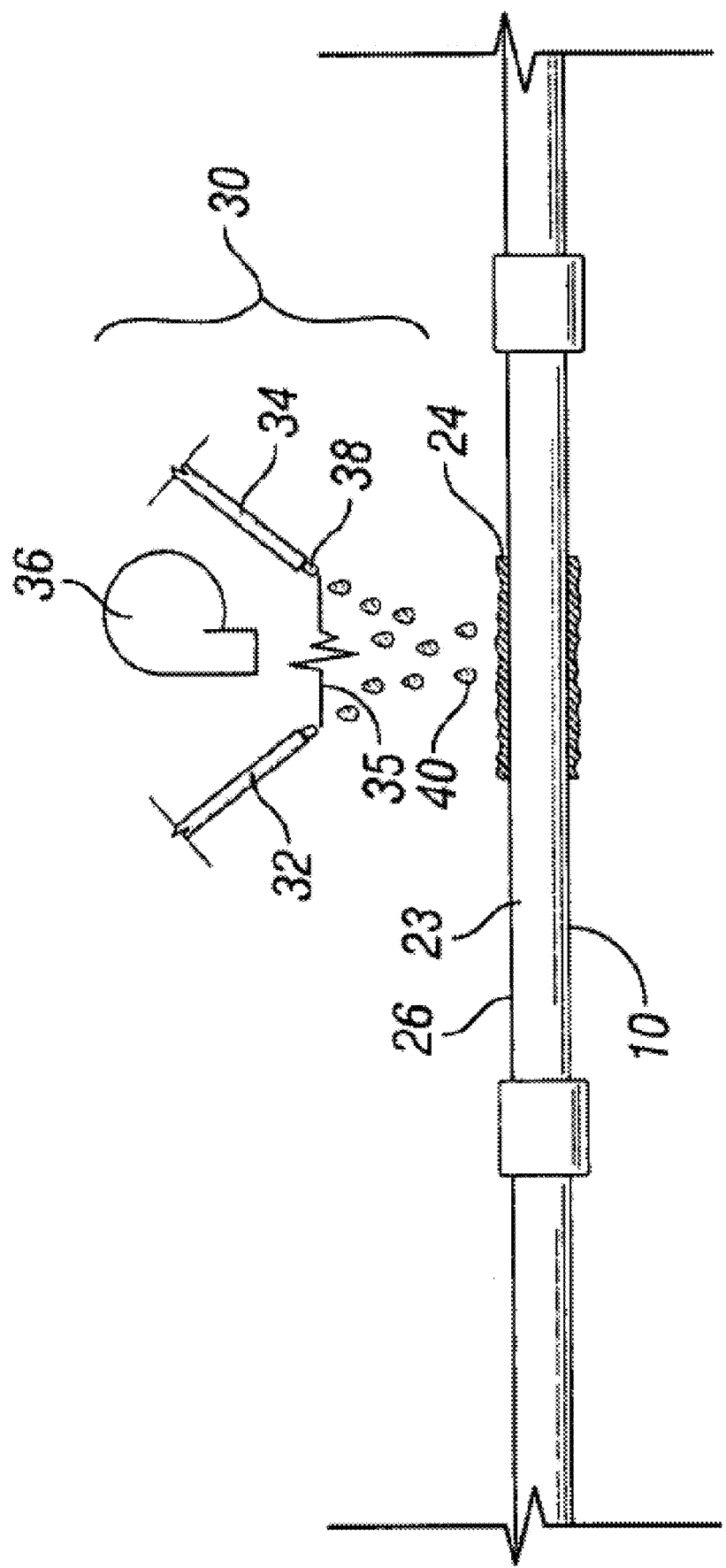
FIG. 1 illustrates one prior art method of thermally spraying a downhole component, which is taken from FIG. 3 of U.S. Pat. No. 7,487,840.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Overview

The present disclosure provides a thermal spray alloy system that is based primarily on copper. The alloy may also comprise nickel, tin, boron, and/or carbon. The alloy may also comprise iron, titanium, aluminum, and/or magnesium. In one embodiment, the alloy comprises a majority weight percentage of copper and nickel, with the remaining elements being optional and/or existing in trace amounts (e.g., less than 0.02 wt %). In one embodiment, the alloy comprises both nickel and copper and either carbon or boron. In another embodiment, the composition is principally copper based with other alloys but not including nickel. In one embodiment, a cored wire (which is typically used in thermal spray applications) is used which comprises an outer sheath that may comprise substantially copper and/or unalloyed copper.

The disclosed copper based alloy system provides numerous advantages and benefits over conventional thermally sprayed alloys. For example, the disclosed alloy is more corrosion resistant than prior art thermally sprayed alloys. To the Applicant's knowledge, no other alloy for thermal spray application utilizes a copper based alloy in the disclosed ranges as part of a cored wire, much less one that provides superior corrosion resistant properties utilizing copper and potentially nickel as the primary elemental components. In one embodiment, an alloy with copper, nickel, and tin provides corrosion protection when applied by thermal spray techniques to a substrate, such as a downhole tool or marine device.

In one embodiment, copper is considered the primary element of the alloy and may be considered essential to the corrosion resistance of the alloy system. In other embodiments, nickel may be considered as a primary element of the alloy. The copper and/or nickel elements are also resistant to microbiologically induced corrosion. Other elements, such as boron and carbon, may be used to retard micro-cracking and improve bond strength. For example, carbon may be added for diffusion bonding and may form free carbon rich islands for lubricity in sliding and wear resistance.

The disclosed alloy system also demonstrates superior thermal conductivity compared to nickel based alloys and stainless steels. For example, FIG. 13 from "Thermal Conductivity of Thermal Spray Metal Coatings" (Report No. 621004348) from Netzsch Instruments North America, incorporated herein by reference, shows superior thermal conductivity results (e.g., specific heat, diffusivity, conductivity, etc.) of a copper nickel alloy as compared to a Monel+SS alloy. The super thermal conductivity of the disclosed alloy system is particularly desirable for downhole components that generate heat, such as for electric submersible pumps (ESPs). For an ESP, the electric motor, seals, and bearings are surrounded by hydrocarbon fluids but in many instances the operation of the motor generates heat that leads to failure. Dissipation of this heat can substantially lengthen the life of the motor and thus the tool. Removing and replacing an ESP can cost from $150,000 to more than $400,000; thus, any ability to substantially extend the life of an ESP provides significant benefits.

The disclosed copper based alloy system also allows application of thick deposits or layers of the coating on a substrate. In other words, in addition to the superior corrosion resistant properties, the disclosed alloy system can be sprayed to achieve thick deposits (e.g., greater than 0.100"), deposits which may be formed up to 3.0". The thick depositions can be used on existing tools or substrates to form centralizers or other shapes as desired.

The disclosed copper based alloy system is also effectively non-magnetic as compared to conventional alloys. Thus, in one embodiment, the disclosed copper based alloy system can be used on and/or to create built up shapes on non-magnetic tools, such as non-magnetic directional tools used in drilling oil and gas wells. The disclosed copper based alloy system is also beneficial in marine environments where bio-fouling and biological growth are problematic issues. For example, in one embodiment, a coating of copper, nickel, and tin mitigates micro-biologically induced corrosion when applied by thermal spray to a wide range of substrates. The alloy also prevents attachment of barnacles and other marine organisms.

Alloy System

Figure 2A:
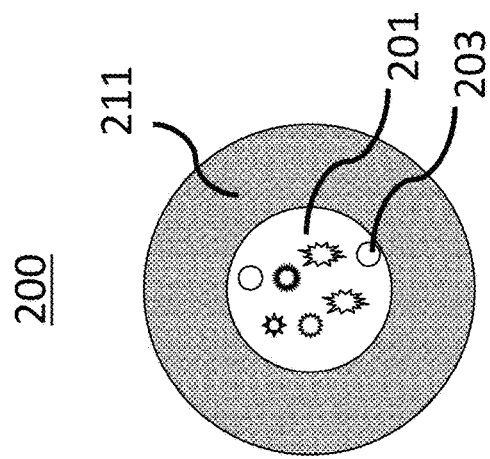
FIG. 2A illustrates a cross-sectional schematic of a cored wire according to one embodiment of the present disclosure.

In one embodiment, the form of the thermally sprayed material is a cored wire, in which the outer sheath may be at least 50% copper by weight, or at least 75% by weight of copper or at least 90% by weight of copper, or a mixture of copper and nickel, such as approximately 70% copper by weight and 30% nickel by weight. In another embodiment, the outer sheath of the cored wire may be substantially copper, such as an unalloyed copper (e.g., an alloy of substantially copper that may contain trace amounts of other elements). Of course, one of skill in the art will recognize based on this disclosure that other ranges of copper and/or nickel is possible. In other embodiments, the disclosed alloy can be produced as a solid wire. In still other embodiments, the disclosed alloy may be applied as a powder. FIG. 2A illustrates a cross-sectional of a cored wire. In one embodiment, cored wire 200 comprises outer sheath 211 and inner core 201. The outer sheath may comprise substantively copper and nickel in one embodiment, or in another embodiment substantially all copper. In one embodiment, the inner core comprises the powdered ingredients of the alloy, and include powdered materials 203 such as borides, carbides, tin, iron oxide, aluminum, etc. In one embodiment, the powdered ingredients comprise aluminum and iron oxide. The making of such outer sheaths and inner cores of a cored wire is known to those of skill in the art.

Table 1 below provides various exemplary ranges of the elemental compositions of the disclosed alloy system, which may be part of a cored wire system. Thus, some of the below elemental components may be located within an outer sheath of the cored wire (such as copper and/or nickel), while other elemental components may be located within an inner core of the cored wire (such as boron, carbon, etc.). Table 1 also provides various exemplary ranges and compositions of different specimens of the disclosed copper nickel based alloy. As referenced in Table 1, Specimen 1 is a cored wire sample that is discussed later in this disclosure as CUNIA Sample 1.

TABLE 1

Elemental Compositions (Percent by Weight)

| Element | Range 1 | Range 2 | Range 3 | Range 4 | Specimen 1 |
|---|---|---|---|---|---|
| Carbon | 0.0-4.0 | 0.0-4.0 | 0.5-4.0 | 3.0-3.5 | 3.2 |
| Boron | 0.0-9.0 | 0.5-9.0 | 0.0-9.0 | 2.5-3.2 | 1.8 |
| Iron | 0.0-5.0 | 0.0-5.0 | 0.0-5.0 | 0.5-1.0 | 1.1 |
| Titanium | 0.0-5.0 | 0.0-4.0 | 0.0-5.0 | 0.5-1.2 | 1.0 |
| Aluminum | 0.0-6.0 | 0.0-6.0 | 0.0-6.0 | 2.5-3.2 | 2.6 |
| Manganese | 0.0-3.0 | 0.0-3.0 | 0.0-3.0 | 0.5-0.9 | 0.5 |
| Nickel | 10.0-40.0 | 10.0-30.0 | 10.0-30.0 | 24.9-25.1 | 28.0 |
| Copper | 50.0-90.0 | 50.0-90.0 | 50.0-90.0 | 53.9-54.3 | 55.6 |
| Tin | 0.0-10.0 | 0.0-10.0 | 0.0-10.0 | 8.0-9.0 | 6.2 |

In one embodiment, the wire composition for thermally spraying to a substrate, prior to melting, may be a majority percentage by weight of copper. In other embodiments, the wire composition may be a majority percentage by weight of copper and nickel. For example, the composition may comprise about 50.0 wt % to about 90.0 wt % of copper and about 10.0 wt % to about 40.0 wt % of nickel. In other embodiments, the composition may comprise about 50.0 wt % to about 95.0 wt % of copper and about 0.0 wt % to about 40.0 wt % of nickel. The composition may further comprise approximately twice the percentage by weight of copper as to nickel, and in other embodiments at least twice the percentage by weight of copper as to nickel. The composition may comprise at least 20 wt % of nickel and at least 50 wt % of copper. In one embodiment, the copper and nickel elements are located substantially within an outer sheath of a cored wire and may not be present in the inner core.

In one embodiment, the wire composition comprises the following elements in order of decreasing weight percentages: copper, nickel, and tin. In one embodiment, the composition may further comprise about 0.0 wt % to about 10.0 wt % of tin, such as at least 5% by weight of tin. In one embodiment, the composition comprises at least copper and nickel, and at least boron or carbon. The composition may further comprise at least about 0.5 wt % of carbon and/or at least about 0.5 wt % of boron. Each of the carbon and boron materials may be located within an inner core of a cored wire. In one embodiment, the composition may further comprise powdered compositions of carbon, iron, titanium, aluminum, and/or manganese.

In one embodiment, the composition may comprise about 50.0 wt % to about 60.0 wt % of copper, about 20.0 wt % to about 30.0 wt % of nickel, about 3.0 wt % to about 4.0 wt % of carbon, about 1.5 wt % to about 4.0 wt % of boron, about 0.5 wt % to about 2.0 wt % of iron, about 0.5 wt % to about 2.0 wt % of titanium, about 2.0 wt % to about 4.0 wt % of aluminum, about 0.5 wt % to about 1.0 wt % of manganese, and about 0.0 wt % to about 10.0 wt % of tin. In one embodiment, the composition of the material may be approximately 55 wt % copper, about 28 wt % nickel, about 3.0 wt % to about 3.5 wt % of carbon, about 1.5 wt % to about 2.0 wt % of boron, about 1.0 wt % to about 1.5 wt % iron, about 1.0 wt % titanium, about 3.0 wt % aluminum, about 0.5 wt % manganese, and about 6 wt % tin. In another embodiment, the composition may comprise about 50.0 wt % to about 95.0 wt % of copper, about 0.0 wt % to about 40.0 wt % of nickel, about 0.0 wt % to about 4.0 wt % of carbon, about 0.0 wt % to about 20.0 wt % of boron, about 0.0 wt % to about 5.0 wt % of iron, about 0.0 wt % to about 5.0 wt % of titanium, about 0.0 wt % to about 20.0 wt % of aluminum, about 0.0 wt % to about 3.0 wt % of manganese, about 0.0 wt % to about 20.0 wt % of tin, about 0.0 wt % to about 6.0 wt % of silicon, about 0.0 wt % to about 5.0 wt % of chromium, and about 0.0 wt % to about 4.0 wt % of zirconium. In one embodiment, the composition of the material may be at least 85 wt % copper and at least 6 wt % aluminum. In one embodiment, the composition of the material may further comprise at least 4.0 wt % boron, at least 2.0 wt % chromium, at least 1.0 wt % zirconium, and/or at least 3.0 wt % iron. Of course, other variations and elemental compositions are possible within the scope of this disclosure, depending on the particular substrate being applied (and its intended application/use) and desired properties of the coating and corrosion resistant layer.

In another embodiment, the composition of the alloy is principally copper based and may include other alloys except for nickel. This nickel-less system may be used for both its corrosion resistance and heat transfer properties. Other potential elements in the disclosed wire composition include aluminum, iron, chromium, zirconium, silicon, manganese, boron, carbon, and/or tin. Depending on the application, these alloys may be changed and substituted to achieve the desired level of corrosion, wear, and/or friction resistance.

An exemplary example of a nickel-less alloy composition may comprise principally copper alloyed with aluminum, iron, boron, tin, manganese and carbon, which may be applied to a component of a fire tube system called a separator. As is known in the art, a fire tube boiler may be a "C" shaped pipe where a combustion flame is in the interior and the exterior of the fire tube is immersed into the produced fluids of an oil well for various heat transfer applications. In certain wells the presence of iron sulfide, hydrogen sulfide, and/or bacteria/microbes may be present in sufficient concentrations to induce aggressive corrosion. These fire tubes are known to fail through-wall corrosion in short periods of time, such as one month. Application of the disclosed alloy to the fire-tube provides corrosion mitigation, wear from erosion, and superior thermal conductivity to the device.

Methods of Use and Application

As described above, the present disclosure is generally directed to forming a durable coating on a substrate that includes one or more layers of thermally sprayed material that is resistant to corrosion. In general, the methods of thermal spray are well known in the relevant art and a variety of different thermal spray techniques may be utilized to apply the disclosed alloy as a coating on a substrate. In one embodiment, to apply a thermal spray coating for a tool the following steps may be generally taken as is known in the art: (i) provide the necessary consumables and equipment, (ii) prepare the tool to be coated, (iii) clean and/or degrease the tool, (iv) sand blast the tool, (v) thermally spray the tool, and (vi) store the tool.

The process of thermal spray is well known to those of skill in the art. Thermal spray is a flexible process and can be applied to a wide variety of substrates and/or surfaces, such as irregular, tubular, or flat surfaces and to virtually any metal or non-metal substrate. In general, the process involves cleaning the substrate and forming a rough surface profile on the substrate, which may be done by grit blasting, chemical etching, or mechanical means. Once profiled, the surface is coated with the disclosed alloy using any of a variety of thermal spray processes, such as High Velocity Oxy-Fuel (HVOF), Twin Wire Arc Spray (TWAS), Cold Spray, and Kinetic Metallization. Each of these different thermal spray processes is well known to those of skill in the art. In one embodiment, the utilized spray gun may be traversed along a cylindrical object where the object is rotating in a fixture such as a lathe or riding on pipe rollers. Traversing of the spray gun may be done manually by a human operator, automatically by robot, or by affixing the gun to a traversing mechanism.

The disclosed coating may be applied to a room temperature substrate or the substrate may be pre-heated to approximately 200-400 degrees Fahrenheit. While typically the coating may be approximately 0.015" thick, the disclosed coating can be applied both thinner and thicker as required. For example, the coating may be as small as 0.006" or as large (or greater) than 0.100" thick and up to approximately 3.0" thick. The tool being coated and the particular application of the tool will dictate the coating thickness.

As discussed above, prior art coatings develop micro-cracks in the coating, some of which may extend to the surface of the coating. To address these cracks, conventional techniques typically paint or treat the coating surface with a low surface tension liquid to penetrate and seal the cracks. In one embodiment, the disclosed thermal spraying process does not require this subsequent treatment of the coating because it has no micro-cracks that open to the surface, so there is no path to absorb the low viscosity sealing liquids. In other words, the disclosed embodiment does not require a subsequent sealing step of the resultant thermally sprayed coating as is typical in conventional techniques.

The disclosed alloy system may also incorporate an exothermic reaction to facilitate transfer of the metallic material onto an exterior portion of the substrate. For example, iron oxide and aluminum may be utilized (such as by powdered elements within a cored wire) to create an exothermic reaction by the following formula: $Fe_2O_3 + 2Al \rightarrow Al_2O_3 + 2Fe + heat$. In one embodiment, the iron oxide (preferably $Fe_2O_3$) and aluminum (Al), in the correct mesh sizes, together decompose in the arc of a twin wire arc spray process and generate an exothermic reaction. Aluminum oxide ($Al_2O_3$) and iron (Fe) are the resultant forms, plus a significant amount of heat. This exothermic reaction super heats the droplets resulting in greater alloy mixing and melting/bonding time for the desired solidification structures to form. The exothermic reaction may also be accomplished by using other oxides and active elements, such as magnesium and silicon with oxides of copper, nickel, molybdenum and organics such as PTFE. Further, the higher temperature generated by this exothermic reaction promotes boron and carbon diffusion, strengthens the structure and greatly reduces the propensity for micro-cracks while minimizing porosity. Of course, the disclosed alloy may or may not use such an exothermic reaction. The disclosed alloy system may also incorporate a free carbon island mechanism that is highly corrosion resistant and adds lubricity of the coating to assist in low friction insertion of the downhole component into a well.

In general, the disclosed copper based coating may be used on any tool (and is not limited to downhole equipment) and with and/or on top of any prior alloy system. For example, a first layer of coating may be applied to a tool (such as an anti-corrosive thermally sprayed coating as disclosed herein) and a second thermally sprayed layer (such as a wear resistance coating as described in U.S. Patent Publication No. 2019/0010598) may be applied to the first layer for its general improved wear resistance benefits. In other embodiments, the anti-corrosive alloy disclosed herein is sprayed on top of a prior thermally sprayed coating or other layer of metallic or non-metallic material.

Figure 2B:
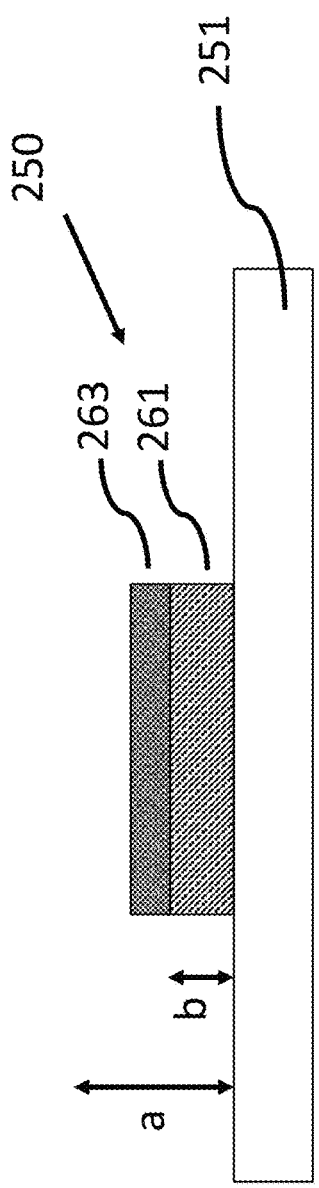
FIG. 2B illustrates one schematic of a coating that comprises a plurality of different layers on the substrate, according to one embodiment of the present disclosure.

FIG. 2B illustrates one schematic of a substrate coating that comprises a plurality of different and/or distinct layers. For example, thermal spray coating 250 on substrate 251 may comprise first coating or layer 261 and second coating or layer 263. Each layer may have the same or a different thickness and composition. For example, layer 261 has a thickness "b," which is greater than the thickness of layer 263. The overall thickness of coating 250 is thickness "a," which may be measured as the total thickness of each of the layers. In one embodiment, first layer 261 may have a first composition and second layer 263 may have a second composition. Additional layers may be utilized. In these embodiments, while the first layer may be bonded to the base material of the substrate/tool, the second and additional layers may only be bonded with adjacent layers and not bonded directly to the base material of the tool. In one embodiment, the coating is deposited on the substrate independent of significant metallurgical changes to the substrate. In one embodiment, first layer 261 may comprise a corrosion resistant layer (such as disclosed herein), and second layer 263 may comprise a wear and/or impact resistant layer, such as that disclosed in U.S. Patent Publication No. 2019/0010598, incorporated herein by reference. For example, as disclosed in the '598 patent Publication, a thermally sprayed layer may comprise reinforcing structures such as whiskers and/or wires. Thus, in one embodiment, an inner layer may resist corrosion and an outer layer may resist wear, abrasion, and/or impact; together, each layer forms a resultant coating that significantly improves the durability of the substrate/coating. In one embodiment, each of the inner corrosion resistant layer and the outer wear resistant layer may be approximately between 0.010" and 0.060" thick. In some embodiments, the outer wear resistant layer may be thicker than the inner corrosion resistant layer. In other embodiments, a first layer may be substantially impact resistant and a second layer may be substantially resistant to corrosion, or vice versa. In some embodiments, some of the layers may contain non-metallic material. Thus, the resulting coating may provide different beneficial properties to the substrate. In one embodiment, each of the layers is applied to the tool in individual steps/procedures.

If different layers are utilized within the coating, each layer may have a different composition, material, and/or thickness. For example, a first layer may use the disclosed corrosive resistance alloy at a thickness of thermal spray of approximately 0.010" to 0.080", and a second layer may use whiskers or wire as the reinforcing structure (as described in the '598 patent Publication) with a thickness of thermal spray of approximately 0.010" to 0.060", thereby creating an overall coating thickness of between approximately 0.060" to 0.140." Of course, other variations and thicknesses are possible. In the case of stabilizer blades on drill motors, heavy weight drill pipe or building of stabilizer tools, the thickness of the thermal spray coating may be up to 3.0."

The thickness of the coating varies based on the desired characteristics of the coating (wear resistance, impact resistance, corrosion resistance, etc.) and the intended application of the coated tool/substrate. In one embodiment, the total coating thickness may be generated in multiple passes. In one embodiment, the coating may be applied in thick deposits exceeding 0.100", although ranges in the amount between 0.020" up to 3.0" are possible. The coating thickness (and/or each separate layer of the coating) may be relatively thin such as between 0.002" to 0.020", or bigger between 0.020" to approximately 0.100", or even greater thicknesses such as approximately 0.35", 0.50", or more. For example, U.S. Pat. No. 7,487,840 (the "840 patent") discloses an iron based coating that is at least 0.100" thick. An overall thickness of the disclosed coating may be less than 0.100" thick (such as approximately 0.090" or less), approximately 0.100" thick, or greater than 0.100" thick.

In one embodiment, the relevant components are downhole oil well production components such as electrically submersible pumps, mud motors, centralizers, stabilizers, sucker rods, and related components and other artificial lift equipment. However, the disclosed wire composition and technique is beneficial in other markets where severe corrosion is present is advantageous. While an embodiment of the disclosure is directed to drill pipe or other downhole components used in the oil and gas industry, a thermally sprayed layer of the disclosed novel alloy can be used in a variety of applications and industries. As one example, the disclosed copper based alloy may be used to form relatively thick coatings (greater than 0.100"), which can be used to form shapes on tools, such as centralizers. For example, the disclosed corrosion resistant thermally sprayed layer may be used for many other downhole components in the oil and gas industry, such as but not limited to drill pipes, drill pipe tool joints, heavy weight pipes, stabilizers, cross-overs, jars, MWDs, LWDs, drill bit shanks, etc. In one embodiment, the relevant components are downhole oil well production components such as electrically submersible pumps, sucker rods, and related components and other artificial lift equipment. The disclosed corrosion resistant thermally sprayed layer may also be used on objects other than downhole components where an increased corrosion resistant layer is needed, such as dredge pups, cable sheaves, helicopter landing runners, etc., including the automotive, aviation, and marine industries. The corrosion layer may also be used on banding to rigidly attach separate components, such as around drill pipe tool joints. In general, the disclosed alloy is applied to components that are subject to corrosion and thermal damage and is beneficial in other markets where severe corrosion is present and/or heat dissipation is advantageous.

EXAMPLES AND TESTS

Various corrosive tests show that the disclosed copper based alloy system provides superior resistance to corrosion as compared to prior art alloys.

Example 1

In one test, stress corrosion cracking (SCC) was performed on two different alloys. The first sample alloy is a first specimen/embodiment of the disclosed copper nickel based alloy ("CUNIA Sample 1"). In this embodiment, CUNIA Sample 1 is a cored wire and comprises copper, nickel, tin, boron, and carbon, and has substantially the same elemental compositions as disclosed above in Specimen 1 in Table 1. The second sample alloy is a traditional Monel+Stainless Steel (SS) alloy sample with a composition of about 40% by weight nickel, about 15% by weight copper, about 9% by weight chromium, about 1% by weight molybdenum, about 1% by weight manganese, less than 1% by weight carbon, less than 1% by weight silicon, and about 15% or more by weight of iron. Two samples of each alloy were exposed along with two iron based alloys for comparison. The test was performed per NACE TM0177 Method B with a four-point bent-beam test fixture. Specifically, this test places the pre-stressed specimens into an autoclave pressure vessel with exposure to corrosive media of 5% NaCl, 10% $H_2S$, 20% $CO_2$, balance N at 1000 psi and 300° F. for seven days. The different alloys (both specimen samples and both iron based alloys) were applied to the same substrate using a conventional twin-wire thermal spray process, such as disclosed in U.S. Pat. No. 7,487,840. The substrate was a corrosion specimen of AISI 4140 low alloy steel. A scanning electronic microscope (SEM) was used to analyze various cross-sectional cuts of the thermally sprayed substrates (from the disclosed alloy, the Monel+SS alloy, and the iron based alloys) after performing a SCC test.

Figure 3:
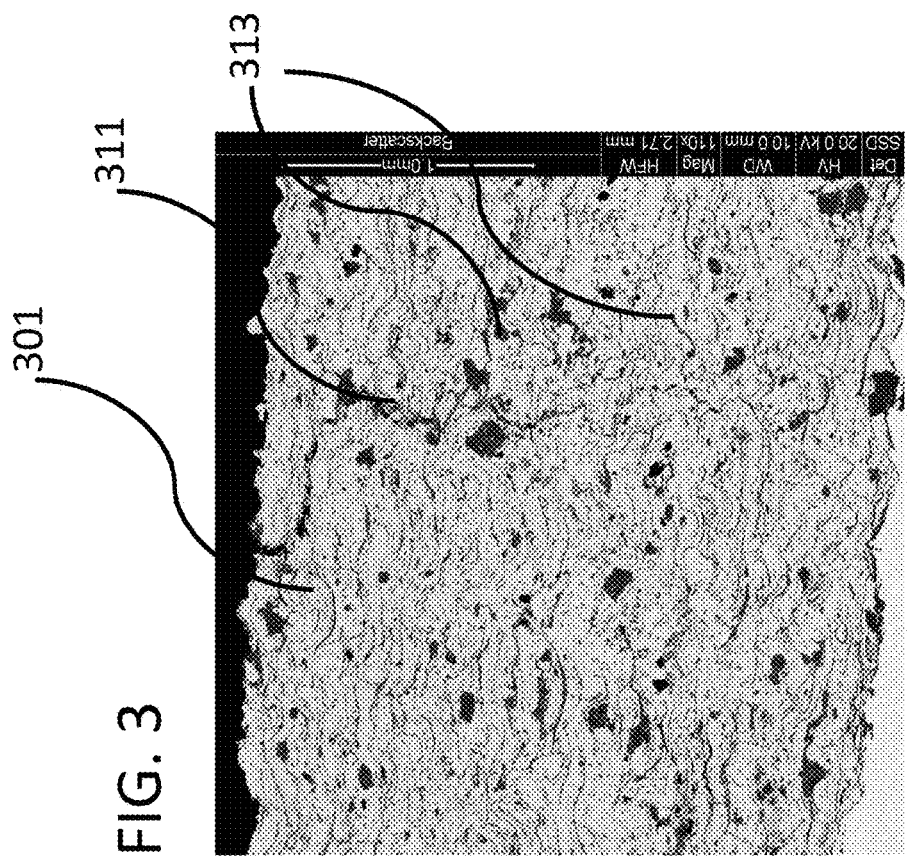
FIG. 3 illustrates a cross-sectional view of a corrosion coupon with a layer of an iron based alloy after a SCC test, at a magnification of 100×.

FIG. 3 shows a cross-sectional view of a layer of the iron based alloy after the SCC test, at a magnification of 100×. As illustrated, coating 301 has various large cracks 311 through the coating and various tributary/branch cracks 313. As is known in the art, these cracks are micro-cracks represent direct corrosion paths for hydrogen sulfide and chloride salts.

Figure 4:
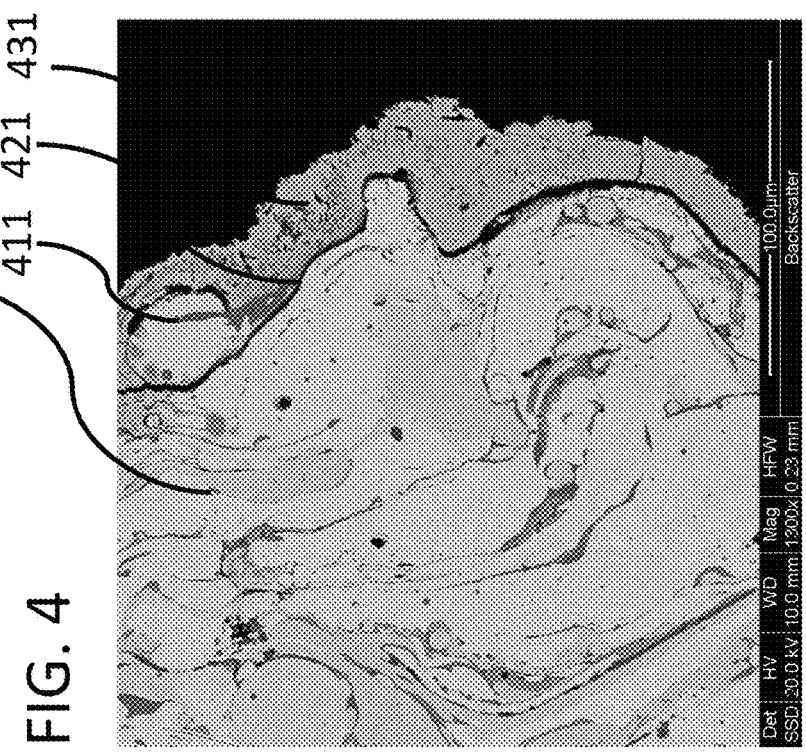
FIG. 4 illustrates a cross-sectional view of a corrosion coupon with a layer of a Monel+SS alloy after a SCC test, at a magnification of 1300×.

FIG. 4 shows a cross-sectional view of a layer of the Monel+SS steel alloy after the SCC test, at a magnification of 1300×. As illustrated, coating 401 has a surface corrosion layer 431 on an exterior portion of the coating. Corrosion path 421 is illustrated that penetrates into the coating, with various droplets 411 detached from the coating. This alloy allows penetration of chlorine and sulfur into the droplet boundaries, thereby inducing corrosion to the extent that the droplets dislodge thus accelerating corrosion. The resulting droplets have various flattened shapes, sizes, and composition.

Figure 5A:
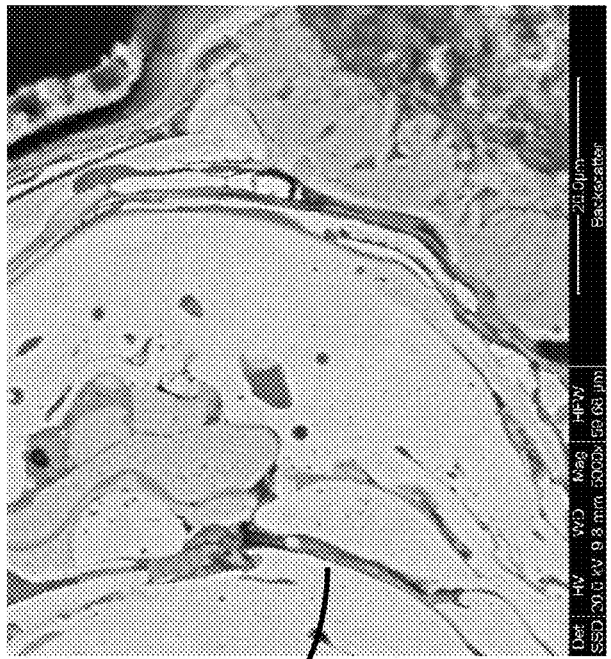
FIG. 5A illustrates a cross-sectional view of a corrosion coupon with a layer of a Monel+SS alloy after a SCC test, at a magnification of 5000×.
Figure 5B:
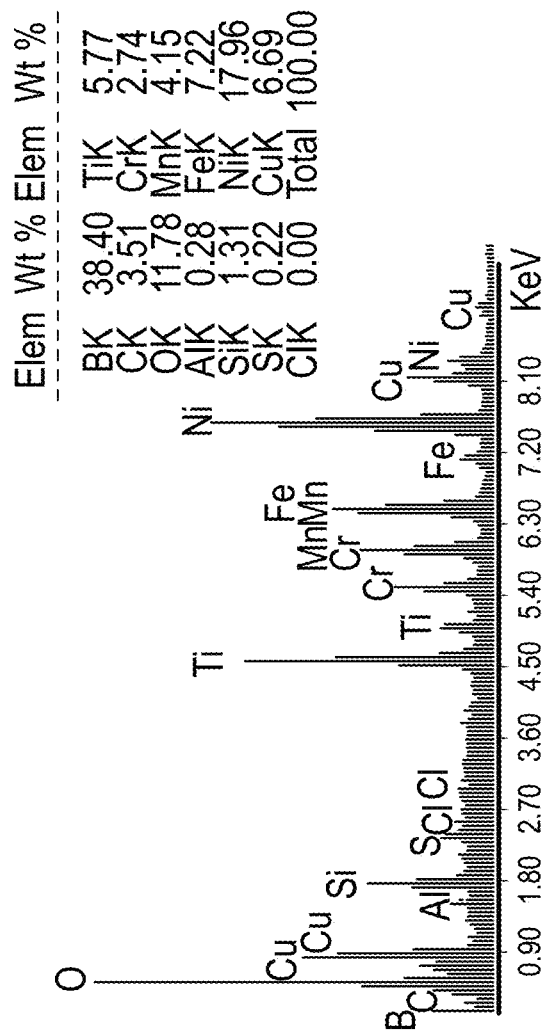
FIG. 5B illustrates the corresponding elemental composition of the alloy breakdown from FIG. 5A against a black strip.

FIGS. 5A and 5B show a cross-sectional view of a layer of the Monel+SS steel alloy after the SCC test at a magnification of 5000× and the corresponding elemental composition of the alloy breakdown in a black strip, respectively. Black strip 501 shows a high sulfur content (as evidenced from FIG. 5B) which indicates that the hydrogen sulfide has penetrated into the splat boundary, evidencing corrosion.

FIGS. 6A, 6B, and 6C show a cross-sectional view of a layer of the Monel+SS steel alloy after the SCC test at a magnification of 1500× and the corresponding elemental composition of the alloy breakdown in both black strip 601 and gray area 603, respectively. Black strip 601 and gray area 603 both show the presence of sulfur (as indicated in FIGS. 6B and 6C) in the splat boundaries well below the coating surface, indicating penetration of hydrogen sulfur and chlorine into the coating and thus corrosion (which is not desired).

Figure 7:
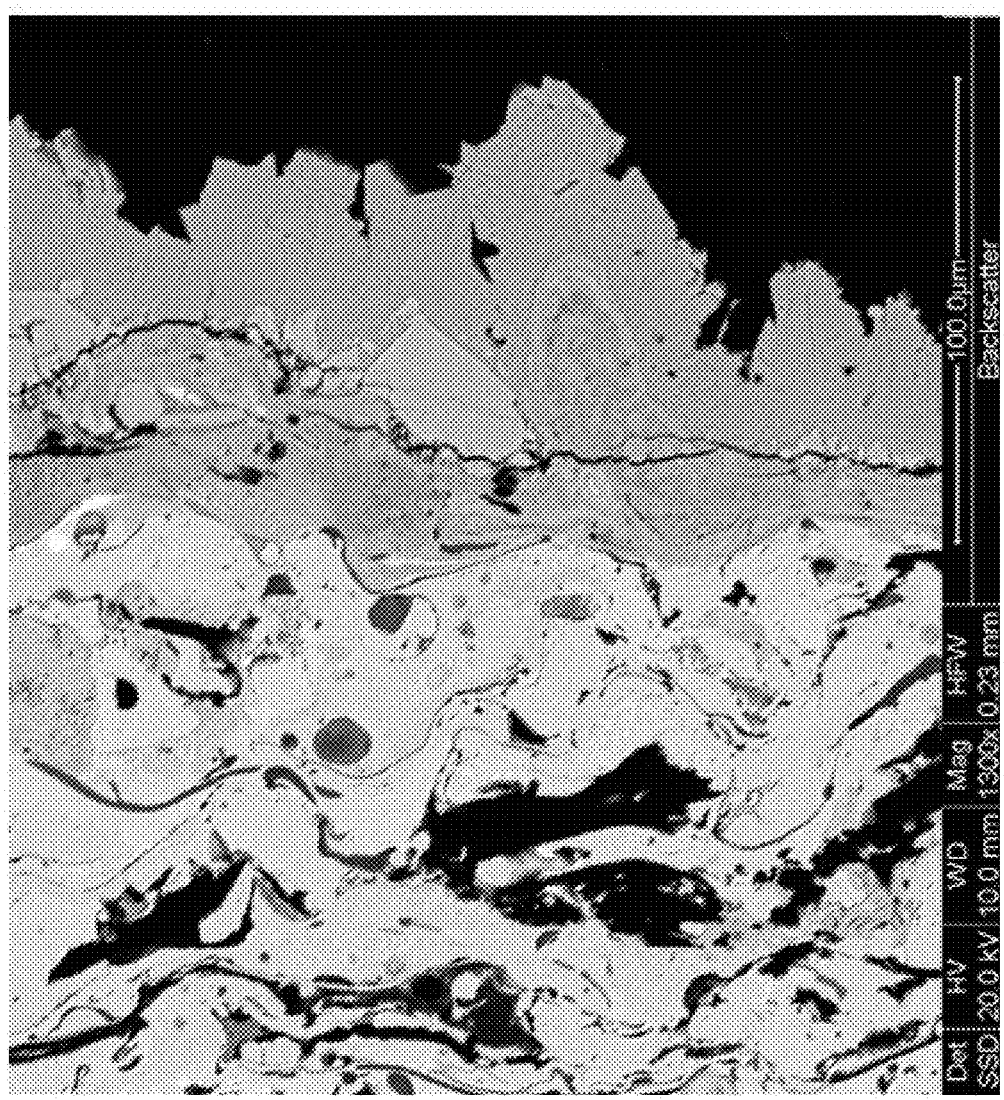
FIG. 7 illustrates a cross-sectional view of a corrosion coupon with a layer of a copper nickel based alloy (CUNIA sample) after a SCC test, at a magnification of 1300×.

FIG. 7 shows a cross-sectional view of a layer of the CUNIA Sample 1 after the SCC test, at a magnification of 1300×. As illustrated, the disclosed copper nickel based coating of the present disclosure has no micro-cracks and no penetration along the splat boundaries.

FIGS. 8A, 8B, and 8C show a cross-sectional view of a layer of the CUNIA Sample 1 after the SCC test at a magnification of 5000× and the corresponding elemental composition of the alloy breakdown in a first black strip 801 and second black strip 803, respectively. The black strips and splat boundaries illustrate the lack of sulfur or chlorine in the splat boundaries (as indicated by FIGS. 8B and 8C) very near corrosion boundary 810. This indicates that any corrosion is only on the surface of the coating and does not penetrate into the coating (which is not desired).

Example 2

In addition to the above-mentioned SCC tests, a direct chlorine attack test was performed on the disclosed copper based alloy and a traditional Monel+SS alloy. A direct chlorine test is a very aggressive test, similar to a salt fog test. The test is an "in house" test conducted by the Applicant, consisting of placing the specimens inside a sealed glass container at ambient pressure and temperature with chlorine and water resulting in an approximate concentration 11.5 ppm of wet chlorine gas for 19 days. The specimens were then removed, cleaned, sectioned, polished, and etched with mixture of hydrochloric acid, nitric acid, and methanol and examined with SEM. The following images are from a scanning electronic microscope (SEM) of various cross-sectional cuts of the thermally sprayed substrates (from the disclosed alloy and the Monel+SS alloy) after performing a direct chlorine attack test.

Figure 9B:
FIGS. 9A and 9B illustrate a cross-sectional view of a corrosion coupon with a layer of a Monel+SS alloy after a chlorine attack test, at a magnification of 300×.
Figure 9C:
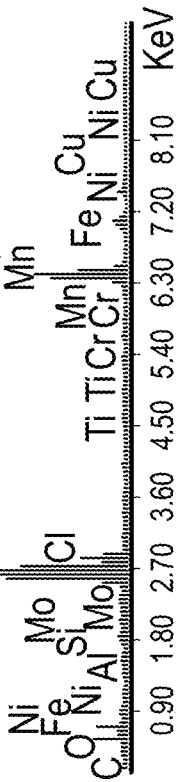
FIG. 9C illustrates the corresponding elemental composition of the alloy breakdown from FIG. 9A.
Figure 9A:
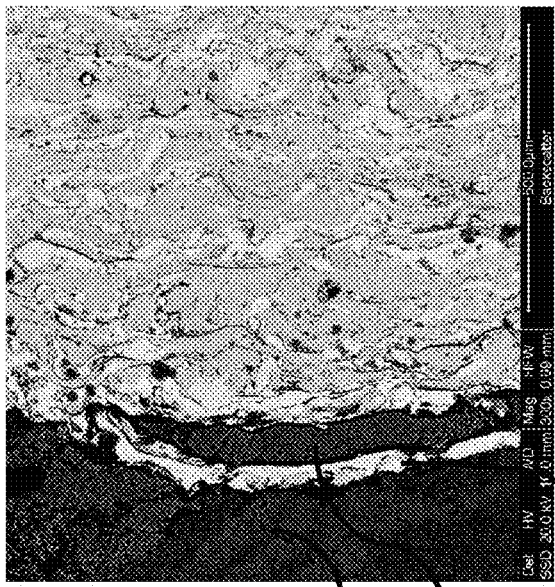

FIGS. 9A, 9B, and 9C show a cross-sectional view of a layer of the Monel+SS alloy after the direct chlorine attack test at a magnification of 300× and the corresponding elemental composition of the alloy breakdown, respectively. These figures illustrate the presence of gross corrosion in a traditional corrosion resistant alloy as evidenced by the large presence of chlorine. In particular, FIG. 9A illustrates corrosion areas 911 adjacent to sprayed metal 901, and FIG. 9B illustrates corrosion areas 951. FIG. 9C shows the large concentrations of chlorine in the coating. FIG. 9A shows corrosion under the splats, which is a worst-case scenario for corrosion. In other words, when corrosion media, such as sulfides and chlorides, penetrate between the droplets where iron oxide forms and swells, this forces the cracks to widen and allows droplets to be removed from the coating. As this mechanism continues (thermal spray build-up layers are essentially mechanically interlocked), the corrosion products eventually reach the substrate interface and begin to penetrate the substrate, which leads to failure not only of the coating but of the substrate.

Figure 10B:
FIGS. 10A and 10B illustrate a cross-sectional view of a corrosion coupon—with a layer of a copper nickel based alloy (CUNIA sample) after a chlorine attack test, at a magnification of 300× and 400×, respectively.
Figure 10A:
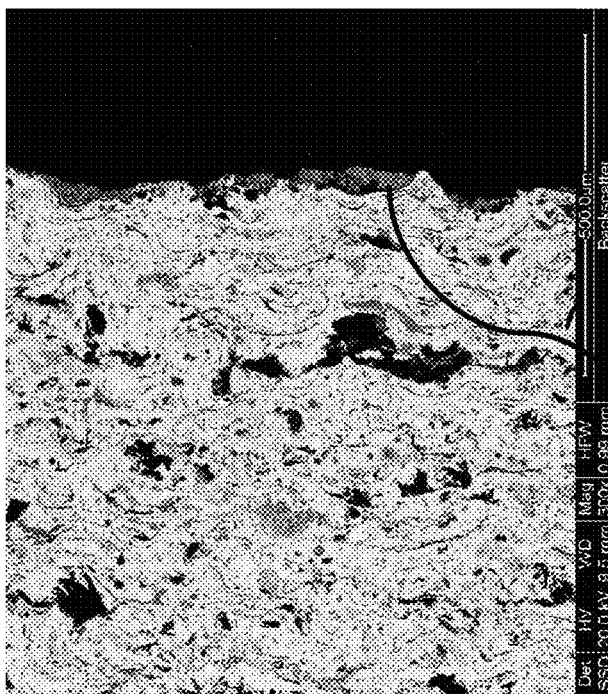
Figure 10C:
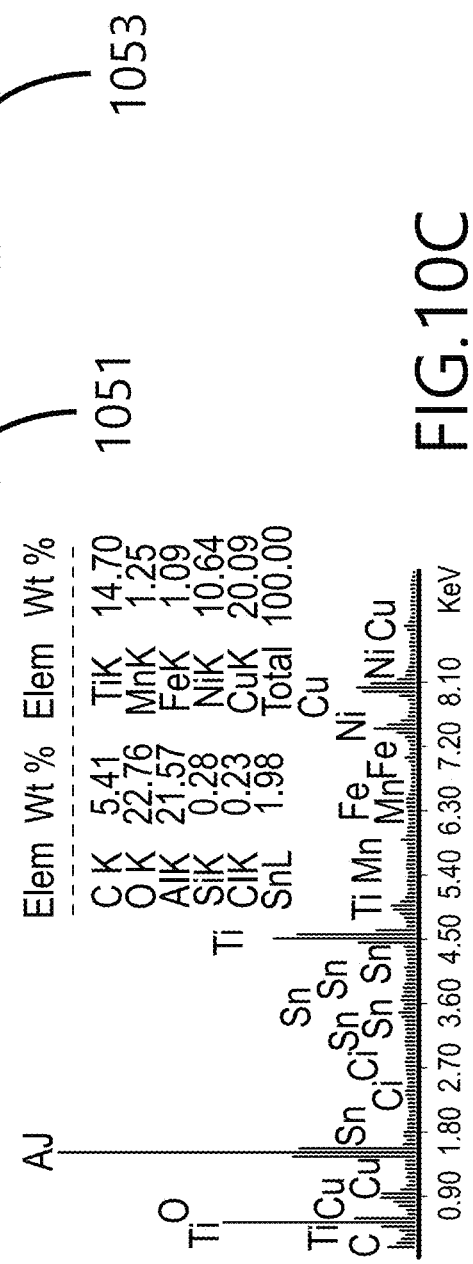
FIG. 10C illustrates the corresponding elemental composition of the alloy breakdown from FIG. 10A.

FIGS. 10A, 10B, and 10C show a cross-sectional view of a layer of the CUNIA Sample 1 after the direct chlorine attack test at a magnification of 300×, 400×, and the corresponding elemental composition of the alloy breakdown under the splat boundaries, respectively. FIG. 10A shows a thin corroded passivation layer 1001 and FIG. 10B shows at the black strip 1053 minimal presence of corrosive elements 1051 as compared to the Monel specimen. FIG. 10C shows that, despite some levels of chlorine, there are still no microcracks or evidence of corrosion beneath the droplets.

As described and illustrated above, the disclosed alloy system (e.g., CUNIA Sample 1) only minimally corrodes on the surface of the coating based on a direct chlorine attack test, while the Monel+Stainless Steel coating allows penetration of chlorine into the droplet boundaries. Further, this penetration of the Monel+SS alloy induces corrosion to the extent that the droplets dislodge from the substrate and/or coating, thus accelerating corrosion loss at a much faster rate than the disclosed alloy system.

Example 3

It is known that marine devices are highly susceptible to corrosion and biofouling. In one embodiment, the disclosed copper based alloy can be used to prevent biological growth and biofouling on marine devices, including devices used in both fresh and salt water. Marine devices include any number of devices, including but not limited to ship hulls, propellers, rudders, offshore structures, buoys, anchors, and anchor chains. In general, any marine device that is susceptible to corrosion or biofouling would benefit from the disclosed thermal spray alloy. In one embodiment, the disclosed copper based alloy system can repel marine organisms such as barnacles, mussels, oysters, and other biological growth.

As marine devices, offshore structures, buoys, etc. sit in water, organisms attach to the surface of the submerged object. In the case of boats and ships, these biological masses create drag which slow a moving vessel. Specifically, for propellers, the organisms may attach to only one of the blades causing the propeller to be out of balance which will cause damage to the drive systems bearings. These organisms are not easily detached by movement through the water alone and require mechanical removal periodically at substantial expense. In the case of buoys and offshore structures that are tethered to the sea floor or are otherwise stationary, the added weight of organisms can substantially change the buoyancy of the structure resulting in sinking lower into the water or full submersion in the case of buoys. While copper based coatings have been applied to marine devices, existing applications and results are unsatisfactory. A new method is needed to apply a new corrosive coating to a marine device.

In one embodiment, the disclosed copper alloy system may be used as a thermally sprayed coating on a propeller. In a test conducted by the Applicant, a corrosion test was performed on an aluminum propeller with various coatings applied to the blades. One blade was left uncoated (e.g., the uncoated blade remains aluminum), one blade was coated with a Monel alloy, and one blade was coated with a copper nickel alloy as disclosed herein. The Monel alloy was used/tested as it has been traditionally considered as a generally corrosion resistant alloy. The Monel and copper nickel alloys were applied to the blades using conventional thermal spray techniques as described herein. After coating, the blades with new coatings were ground to a smooth surface with a grinding tool. The propeller was placed in a fresh water pond and periodically retrieved and analyzed for biological growth.

FIG. 11A shows the propeller after application of thermally sprayed coatings and before being placed in a pond. Blade 1101 is the standard aluminum blade (uncoated), blade 1103 is thermally coated with a Monel alloy, and blade 1105 is thermally coated with a copper nickel alloy as disclosed herein. FIG. 11B shows the propeller after 2 months of being in the freshwater pond before any washing/cleaning of the blades. Aluminum blade 1101 is covered in-marine organisms, Monel blade 1103 has some residue, and copper nickel alloy blade 1105 had no residue. FIG. 11C shows the propeller after 4 months of being in the freshwater pond and after a thorough washing/cleaning. Even after washing, aluminum blade 1101 is full of residue and green fungus and shows pitting corrosion. Monel blade 1103 has residue and green fungus and some swollen areas indicating corrosion underneath the coating, while the copper nickel blade 1105 has no residue or fungus. Before washing, the aluminum and Monel blades had significant clumps of mud that stuck to the blades, while the copper nickel blade has no mud or dirt clumps, which is evidence that the attachment of marine organisms presents an anchor pattern for collection of debris.

These tests demonstrate that the disclosed copper nickel alloy has superior resistance to corrosion and biological growth to not only uncoated marine devices but also to existing supposedly "corrosive" resistance thermally sprayed alloys, such as a Monel alloy, stainless steel alloys, and other materials (such as fiberglass) that are generally considered corrosion resistant but are subject to biofouling.

Example 4

In one embodiment, the disclosed copper based alloy allows application of thick deposits or layers of the coating on a wide range of substrates. In other words, in addition to the superior corrosion resistant properties described herein, the disclosed alloy system can be sprayed to achieve thick deposits (e.g., greater than 0.100"), and may be used to spray deposits up to approximately 3" in thickness. In some embodiments, the thick depositions can be used on existing tools or substrates to form centralizers or other shapes as desired. In still other embodiments, the thick deposits can be used to repair or spray thick coatings on a wide range of substrates, such as damaged rotors.

In some embodiments, the composition may be applied to a downhole component acting as the substrate. In one example, the downhole component may be an oilfield tubular (e.g., a casing or drill pipe). As mentioned above, U.S. Pat. No. 9,920,412 (the '412 patent) discloses a chromium free alloy that can be thermally sprayed onto materials, and in some embodiments can be used to form a downhole centralizer or stabilizer. FIGS. 12A-12C (which are reproduced from FIGS. 3, 4, and 6 of the '412 patent) illustrate various embodiments of a downhole component that may be at least partially formed by thermally spraying the disclosed copper based alloy on some or all of the tool. FIG. 12A illustrates downhole tool 1201, which is a centralizer with blades 302, FIG. 12B illustrates downhole tool 1211, which is a centralizer with blades 302, and FIG. 12C illustrates downhole tool 1221, which is a centralizer with blades 508. It will be appreciated that the illustrated centralizers are but one type of downhole tool that may be employed with the compositions and methods of the present disclosure, and is described herein for illustrative purposes only. Each of these centralizer blades may be constructed from an embodiment of the copper based wire composition discussed herein. The blades may be formed from a thermally sprayed layer, and may be coupled directly to and extend outwards from the tubular device. In other embodiments, the blades may be formed as structures separate from the tubular, and may be coated with an embodiment of the copper based wire composition discussed above, such that the blades of the centralizer (or another portion of another tool) may provide the substrate. In either example, whether the thermally sprayed layer(s) forms the blades (or another structure) or is formed as a coating on the blades, the thermally sprayed coating/layer may be considered to be extending outwards from the base tubular. Such blades or protrusions may extend radially outwards from the tubular by a distance of between about 0.010" and about 3.0", although other distances are contemplated and may be employed without departing from the scope of the present disclosure. Moreover, the distance need not be constant along the blades, and in some embodiments may vary along the length of the tool/substrate. Some or all of this tool blade or protrusion may be formed by multiple passes of thermally sprayed layers of the disclosed copper based alloy. In other words, in some embodiments, the entire blade or protrusion (e.g., the formed centralizer shape)—which may be up to 3.0"—may be formed by layers of a thermally sprayed alloy as disclosed herein. While a centralizer is discussed above by way of example, it may be substituted with any other type of tool, such as a stabilizer, packer, cement basket, hole opener, scraper, control-line protector, turbulator, sand screen, etc. In other words, a wide variety of shapes and tools may be formed by relatively thick depositions of a thermally sprayed copper based coating a described herein.

Such a copper based centralizer or downhole tool offers many advantages over existing centralizers or tools (such as one disclosed in the '412 patent) because it is generally crack free and prevents crack formation. Thus, the disclosed copper based alloy is not only more crack resistant but is also more corrosion resistant and has much greater thermal conductivity than existing thermally sprayed alloys.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the system are within the scope of the invention. For example, the alloy may or may not include tin, manganese, and/or titanium, and may include boron and/or carbon. The tool to be coated may be a downhole component or other tool used in the oil and gas industry, or may be applied to any object or tool that needs an increased corrosive protection layer and/or thermally dissipative layer, such as in the aviation, refining, chemical, processing, and marine industries, as well as dredge pups, cable sheaves, and helicopter landing runners, among others. The alloy may have other desirable properties besides corrosion resistance, such as being a conductor of heat (for heat dissipation purposes) or crack resistant or wear resistant or electrical conductivity. In still other embodiments, the thermal spray alloy composition may not contain nickel and may contain primarily or substantially copper along with other alloys. In one embodiment, the substrate may be a metallic or non-metallic material, such as drill pipe or fiberglass. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A thermal spray composition for thermally spraying to a substrate, the composition comprising:
   about 50.0 wt % to about 85.0 wt % of copper; and
   about 10.0 wt % to about 40.0 wt % of nickel,
   about 0.5 wt % to about 4.0 wt % of carbon;
   about 0.5 wt % to about 4.0 wt % of boron;
   about 0.5 wt % to about 2.0 wt % of iron;
   about 0.5 wt % to about 2.0 wt % of titanium;
   about 2.0 wt % to about 4.0 wt % of aluminum;
   about 0.5 wt % to about 1.0 wt % of manganese; and
   about 0.0 wt % to about 10.0 wt % of tin.

2. The composition of claim 1, wherein the composition comprises at least twice the percentage by weight of copper as nickel.

3. The composition of claim 1 wherein the composition comprises about 20 wt % to about 30 wt % of nickel.

4. The composition of claim 1, wherein the copper and nickel elements are located substantially within an outer sheath of a cored wire.

5. The composition of claim 1, wherein the composition comprises about 75 wt % to about 85 wt % of copper.

6. The composition of claim 1, wherein the composition comprises:
   about 50.0 wt % to about 60.0 wt % of copper;
   about 20.0 wt % to about 30.0 wt % of nickel.

7. The composition of claim 1, wherein the composition comprises:
   about 50.0 wt % to about 56.0 wt % of copper;
   about 25.0 wt % to about 30.0 wt % of nickel;
   about 2.0 wt % to about 4.0 wt % of carbon;
   about 1.0 wt % to about 2.0 wt % of boron;
   about 0.5 wt % to about 1.5 wt % of iron;
   about 1.0 wt % of titanium;
   about 2.0 wt % to about 3.0 wt % of aluminum;
   about 0.5 wt % to about 1.0 wt % of manganese; and
   about 6.0 wt % to about 10.0 wt % of tin.

8. The composition of claim 1, wherein the composition is prior to melting.

9. The composition of claim 1, further comprising a plurality of powdered elements, wherein the copper is located substantially within an outer sheath surrounding the powdered elements.

10. A cored wire for thermally spraying to a substrate, the cored wire comprising:
    an inner core comprising a plurality of powdered elements; and
    an outer sheath substantially enclosing the plurality of powdered elements of the inner core,
    wherein the outer sheath comprises at least 50.0 wt % of copper,
    wherein the plurality of powdered elements comprises boron, carbon, and tin.

11. The cored wire of claim 10, wherein the outer sheath comprises at least 75% of copper.

12. The cored wire of claim 10, wherein the outer sheath comprises at least 90% of copper.

13. The cored wire of claim 10, wherein the outer sheath is unalloyed copper.

14. The cored wire of claim 10, wherein the outer sheath comprises about 10.0 wt % to about 40.0 wt % of nickel.

15. The cored wire of claim 10, wherein the cored wire is substantially nickel-free.

16. The cored wire of claim 10, wherein the plurality of powdered elements further comprises iron, titanium, aluminum, and manganese.

17. The cored wire of claim 10, wherein the plurality of powdered elements further comprises chromium and zirconium.

18. A thermal spray composition for thermally spraying to a substrate, the composition comprising:
   about 90.0 wt % to about 95.0 wt % of copper;
   about 0.0 wt % to about 10.0 wt % of nickel;
   about 0.5 wt % to about 4.0 wt % of carbon; and
   about 0.5 wt % to about 4.0 wt % of boron.

19. The composition of claim 18, wherein the composition is a substantially nickel-free composition.

20. The composition of claim 18, wherein the wherein the copper is located substantially within an outer sheath of a cored wire.

21. The composition of claim 20, wherein the outer sheath is unalloyed copper.

* * * * *